United States Patent [19]
Murakami et al.

[11] Patent Number: 5,930,388
[45] Date of Patent: Jul. 27, 1999

[54] COLOR IMAGE PROCESSING APPARATUS

[75] Inventors: Yoshinori Murakami; Tatsuya Tanaka, both of Yamatokoriyama; Makio Goto, Nara, all of Japan

[73] Assignee: Sharp Kabuskiki Kaisha, Osaka, Japan

[21] Appl. No.: 08/953,155

[22] Filed: Oct. 17, 1997

[30] Foreign Application Priority Data

Oct. 24, 1996 [JP] Japan .................................. 8-282294

[51] Int. Cl.$^6$ .............................. G06K 9/00; H04N 1/46
[52] U.S. Cl. ......................... 382/167; 358/518; 358/525
[58] Field of Search .................... 382/162, 166, 382/167; 358/518, 521, 523–525; 345/431; 395/109

[56] References Cited

U.S. PATENT DOCUMENTS

| | | | |
|---|---|---|---|
| 5,311,332 | 5/1994 | Imao et al. | 358/518 |
| 5,546,195 | 8/1996 | Arai | 358/518 |
| 5,552,904 | 9/1996 | Ryoo et al. | 358/518 |
| 5,717,507 | 2/1998 | Vondran, Jr. | 358/518 |
| 5,724,442 | 3/1998 | Ogatsu et al. | 382/167 |
| 5,786,907 | 7/1998 | Lotspiech | 382/167 |
| 5,831,751 | 11/1998 | Ohneda et al. | 358/521 |

OTHER PUBLICATIONS

T. Itoh, The Journal of Electrophotographic Institute *Color Correction Techniques for Correct Color Reproduction*, vol. 29, No. 3, 1990, pp. 51–57.

*Primary Examiner*—Leo H. Boudreau
*Assistant Examiner*—Bhavesh Mehta
*Attorney, Agent, or Firm*—Dike, Bronstein, Roberts & Cushman, LLP

[57] ABSTRACT

A color image processing apparatus of the present invention includes (1) first lattice for dividing a color separation signal space in the form of a lattice so as to store in a table coordinates of lattice points of the color separation signal space thus divided and (2) second lattice for further dividing a specific unit cube of the lattice in the form of a lattice so as to additionally store in the table coordinates of lattice points of the specific unit cube thus divided. Depending on whether or not inputted image data of image information belong to the specific unit cube of the lattice, color correction method having different conversion accuracy is adopted, thereby permitting to provide a color image processing apparatus which reduce the occurrence of an error when color-correcting a color requiring accurate color correction, and prevent the continuity of an image from being not kept.

12 Claims, 8 Drawing Sheets

DIVIDED INTO 17 UNITS

COLOR IMAGE PROCESSING APPARATUS

FIELD OF THE INVENTION

The present invention relates to a color image processing apparatus for color-correcting inputted image information according to color data which are based on color separation signals so as to output the inputted image information.

BACKGROUND OF THE INVENTION

Conventionally, a color image processing apparatus such as a color copying machine, a color printer, and a color facsimile has been available. Such a color image processing apparatus reads a color original image by input means such as a color scanner, and outputs the copy image of the color original image by output means such as a color hard copying device.

Incidentally, in the above-mentioned color image processing apparatus, in the case of outputting inputted image data as they are by the output means, the inputted image data are almost always outputted as a copy image having different colors from those of the original image. This results from the fact that various types of input and output means differ in their characteristics.

Hence, color correction is carried out so as to faithfully reproduce the copy image having the colors of the original image.

As a common color correction technique, for example, "Color Correction Techniques for Correct Color Reproduction" in The Journal of Electrophotographic Institute, Vol. 29, No. 3 (1990) discloses the following color correction techniques: a color correcting process by encipherment using the polynomial regression analysis, the three-dimensional interpolation using a look-up table, and a color correcting process using a neural network without encipherment.

In the above-mentioned methods using the polynomial regression analysis, a color correction calculation is carried out using a color converting matrix. However, when a single color converting matrix is adapted for all the color regions, the accuracy is reduced. As a countermeasure, U.S. Pat. No. 5,552,904 discloses "Color Correction Method and Apparatus Using Adaptive Region Separation" wherein a color space is divided so as to carry out color correction with respect to an inputted image using a different color converting matrix for each divided region.

Namely, according to the color correction method disclosed in the above U.S. Patent, a color space is divided into a plurality of regions and a color converting matrix suited for each region thus divided is found, and the coefficient of the each color converting matrix thus determined is stored in a look-up table. The coefficient of the color converting matrix corresponding to inputted image data is selected so as to carry out color correction with respect to the inputted image data in accordance with the selected color converting matrix.

Note that, the above-mentioned U.S. Patent also teaches criteria for dividing the color space into a plurality of regions. However, as far as the color correction method is concerned, the same color correction methods but having different coefficients are adopted for both the divided color space and the color space which is further divided. Also, because the color space is divided into a plurality of regions, and a different color converting matrix is adopted for each region thus divided, the method disclosed in the described publication has a problem in that the continuity of color signals is not kept in the vicinity of the border line of each region.

Also, in a conventional color image processing apparatus adopting the color correction by the three-dimensional interpolation using a look-up table indicative of an input-output relationship, a problem such as an interpolation error is caused.

Further, in the case of extracting a certain region such as flesh tones to be accurately color-corrected so as to carry out the process of color correction on the region thus extracted, such a problem is caused wherein the continuity of color signals is broken in the vicinity of the border line of the color region thus extracted.

SUMMARY OF THE INVENTION

It is an object of the present invention to provide a color image processing apparatus which (1) reduces the occurrence of an error when color-correcting a color requiring highly accurate color correction and (2) prevents the continuity of an image from not being kept.

In order to achieve the above object, a color image processing apparatus of the present invention includes input means, color correcting means, and output means, wherein the input means reads image information of an inputted color original image, the color correcting means carries out color correction in accordance with inputted color data based on each color separation signal of the inputted image information, and the output means outputs corrected image data which have been color-corrected, including first lattice means for dividing a color separation signal space in the form of a lattice so as to store in a table coordinates of lattice points of the color separation signal space thus divided, and second lattice means for further dividing a specific unit cube of the lattice in the form of a lattice so as to additionally store in a table coordinates of lattice points of the specific unit cube thus divided, wherein color correction with different conversion accuracy is carried out depending on whether the inputted color data of the image information belong to the specific unit cube of the lattice.

In the color image processing apparatus of the present invention, inputted color data based on each color separation signal belong to any one of the unit cubes which have been provided by dividing the color separation signal space in the form of a lattice. In the case of accurately outputting, for example, flesh tones, the unit cube provided with flesh tones is set as a specific unit cube. This induces the specific unit cube to be further divided in the form of a lattice, and its coordinates of the lattice points are additionally stored in a table.

Thus, in the case where the inputted color data belong to the specific unit cube, it is judged that the inputted color data belong to which of finer unit cubes. The inputted color data are then subjected to color correction according to the table data indicative of the coordinates (apices) of the fine unit cube of the second lattice means.

In the present invention, depending on whether or not the inputted color data belong to the specific unit cube in the lattice, color correction with different conversion accuracy is carried out.

Thus, for example, in the case where the inputted color data do not belong to the specific unit cube, it is possible to adopt a color correction method using the table data of the first lattice means in which practical conversion accuracy can be obtained with simple algorithm. As such a color correction method, the prism interpolation method can be adopted.

Also, in the case where the inputted color data belong to the specific unit cube, it is possible to adopt a color correction method using the table data of the second lattice means. In this case, compared with the case of adopting the prism interpolation method, higher accuracy can be obtained, but the processing speed is slower. As such a color correction method, the cubic interpolation method can be adopted.

Note that, even in the case where the same color correction method (for example, the prism interpolation method) is adopted regardless of whether or not the inputted image data belong to the specific unit cube, because the table data of the first lattice means and the table data of the second lattice means are divided differently, the color correction method differs in conversion accuracy.

As described, different types of color correction methods can be adopted depending on whether or not the inputted color data belong to the specific unit cube in the lattice. This makes it possible to carry out highly accurate color correction with respect to a specified color such as flesh tones. Also, this makes it possible to carry out rapid color correction and an output process with respect to other colors. Further, provided that sufficient accuracy can be obtained in the interpolation method adopted, it is possible to adopt an interpolation method having a fast processing speed.

Also, a specified color is color-corrected by using the table data, represented by the fine lattices, of the second lattice means, thereby reducing the occurrence of an interpolation error.

Further, since the inputted color data of each lattice of the color separation signal space which has been divided in the form of a lattice are color-corrected according to the coordinates of the lattice points of the unit cube provided with the inputted color data, each lattice constitutes data of the border, thereby permitting to carry out color correction taking into account of the continuity of adjacent regions.

Thus, it is possible to provide a color image processing apparatus which (1) reduces the occurrence of errors when color-correcting colors requiring highly accurate color correction, and (2) prevents the continuity of an image from not being kept.

For a fuller understanding of the nature and advantages of the invention, reference should be made to the ensuing detailed description taken in conjunction with the accompanying drawings.

DESCRIPTION OF THE EMBODIMENTS

First Embodiment

The following will describe a first embodiment of the present invention.

Figure 2:
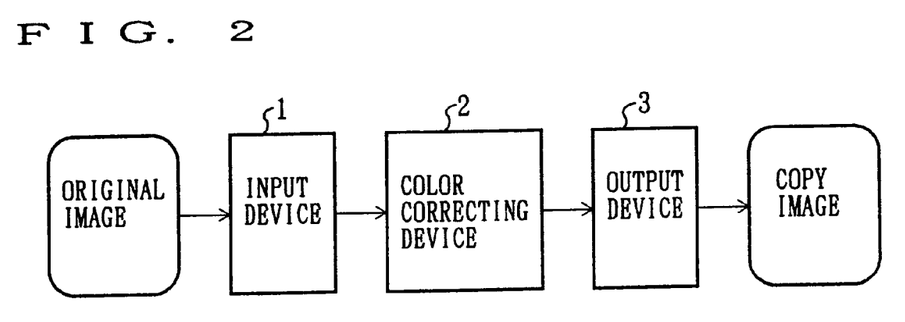
FIG. 2 is a block diagram showing a schematic structure of the color image processing apparatus.

A color image processing apparatus of the present embodiment such as a color copying machine, a color printer, and a color facsimile is, as shown in FIG. 2, provided with an input device 1 (inputting means) for inputting image information of an original image, a color correcting device 2 (color correcting means) for correcting color data of the inputted image information, and an output device 3 (outputting means) for outputting the image information including the color data which have been subjected to color correction so as to obtain a copy image.

The input device 1 is provided, for example, with a color scanner (not shown) for reading an original image. The color scanner optically scans the color original image so as to obtain digital color separation signals of red (R), green (G), and blue (B) (hereinafter referred to as RGB signals). Note that, the color scanner separates the optically scanned original image into digital signals of R, G, and B respectively having 256 tones.

The output device 3 is provided, for example, with a color hard copying device (not shown). The color hard copying device outputs an image based on density signals of cyan (C), magenta (M), and yellow (Y) or black (K) (hereinafter referred to as CMY(K) signals). Note that, the color hard copying device prints out a copy image in a digital density of 256 tones with inks of CMY(K).

Figures 3A, 3B:
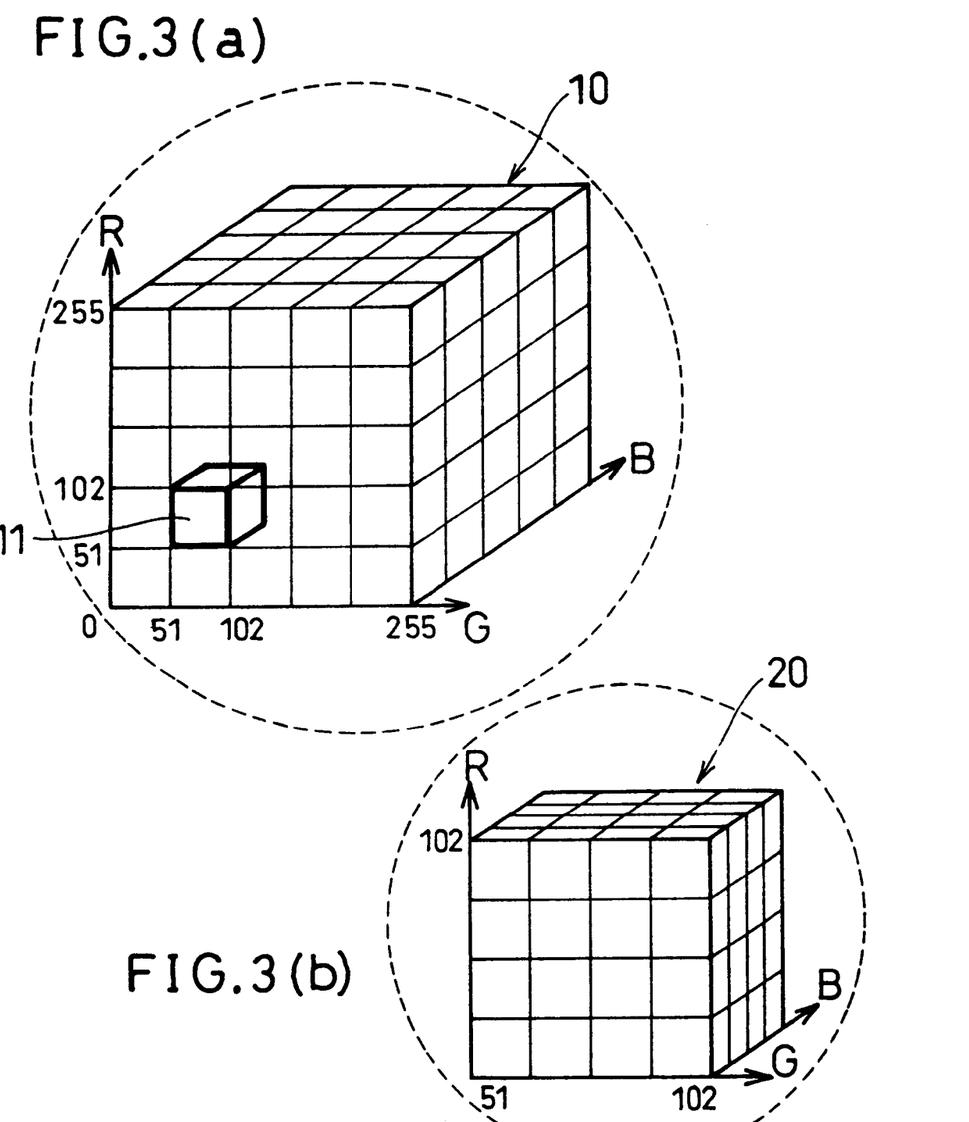
FIG. 3(a) is an explanatory drawing showing a first lattice which is obtained by dividing an RGB color separation signal space in the form of a lattice.
FIG. 3(b) is an explanatory drawing showing a second lattice which is obtained by further dividing a specific unit cube of the first lattice.

The color correcting device 2 carries out the three-dimensional interpolation using a look-up table with respect to R, G, and B so as to determine color correction signals CMY(K). As shown in FIG. 3(a), the color correcting device 2 divides a color separation signal space having axes of R, G, and B in the form of a lattice (a first lattice 10) so as to store in the look-up table the coordinates of each lattice point of the first lattice 10. Namely, the look-up table stores the coordinates (apices) of each unit cube, which constitute color correction data. Note that, the look-up table is stored in a RAM (not shown). Also, (1) the first lattice 10 and (2) the look-up table storing the coordinates (apices) of the each unit cube of the first lattice 10 function as first lattice means.

In the case of accurately color-correcting a specified color, e.g. flesh tones, as shown in FIG. 3(b), a specific unit cube 11 provided with the RGB signals corresponding to the flesh tones is further divided beforehand in the form of a lattice (a second lattice 20), and the coordinates of each lattice point of the second lattice 20 are additionally stored in the look-up table. Note that, (1) the second lattice 20 and (2) the look-up table storing the coordinates of each lattice point of the second lattice 20 function as second lattice means.

In the example shown in FIG. 3(a) and FIG. 3(b), each R, G, and B axis of the color separation signal space is divided into 5 units so that the color separation signal space constitutes the first lattice 10. Similarly, each R, G, and B axis of the specific unit cube 11 of the first lattice 10 is divided into 4 units so that the specific unit cube 11 constitutes the second lattice 20. Thus, the look-up table stores 333 data (6×6×6+ 5×5×5−8=333).

Figure 1:
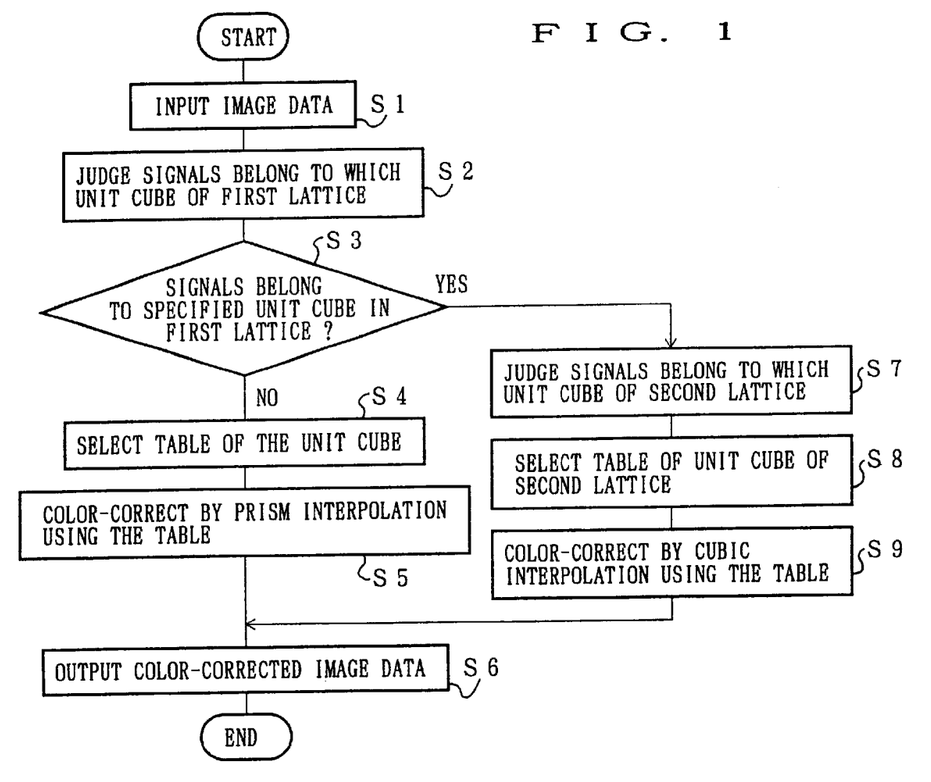
FIG. 1 is a flowchart showing color correction operation in accordance with one embodiment of a color image processing apparatus of the present invention.

The following will describe, referring to the flowchart shown in FIG. 1, processing steps of color correction by the color correcting device 2 wherein the three-dimensional interpolation is carried out using the look-up table.

As shown in FIG. 1, first, image data are inputted through the input device 1 (S1). When the color correcting device 2 carries out color correction with respect to the image data, it is judged in S2 that the RGB signals belong to which unit cube of the color space of the first lattice 10.

If the RGB signals exist in a unit cube other than the specific unit cube 11 (NO in S3), a look-up table storing coordinates of lattice apices of the unit cube provided with the RGB signals is selected (S4). Thereafter, the image data are color-corrected by the three-dimensional interpolation using the prism interpolation method (S5), and the image data thus color-corrected are outputted through the output device 3 (S6).

Note that, as the three-dimensional interpolation carried out in S5, an interpolation method such as the prism interpolation method is adopted wherein practical conversion accuracy can be obtained by simple calculation algorithm.

The following will describe the three-dimensional interpolation. The three-dimensional interpolation includes, for example, the cubic interpolation method, the tetrahedron interpolation method, and the prism interpolation method.

In the cubic interpolation method, which is most widely adopted, an input color space is simply divided along each axis of the three colors (R, G, and B) into a cube having 8 lattice points, so that the output value with respect to the inner points of the cubes is expressed by a weighted summation of third order equation with 8 terms. The cost of calculation in the cubic interpolation method is higher compared with those of the tetrahedron interpolation method and the prism interpolation method. In particular, the cubic interpolation method has a drawback in that numerous multiplication steps are required in the third order equation. Nevertheless, because the cubic interpolation method handles the largest number of lattice points at a time, the cubic interpolation method, in general, has high interpolation accuracy.

In the tetrahedron interpolation method, a unit cube is further divided into a plurality of tetrahedra, and after it is judged that the input values with respect to the inner point of the cube belong to which one of the tetrahedra thus divided, interpolation values are determined by taking a weighted summation of output values respectively corresponding to four lattice points surrounding the input point.

Namely, because the tetrahedron is the smallest unit constituting the three-dimensional space, and the number of lattice points employed at a time is 4 which is also the smallest, the tetrahedron interpolation method is the simplest of the three methods, and the cost of calculation is also the lowest. Note that, although there are a number of methods for dividing a unit cube into tetrahedra, in the simplest dividing method, the unit cube is divided along its diagonal lines into six tetrahedra each having the same volume.

As described, although the tetrahedron interpolation method is the simplest of the three methods, it has a problem in interpolation accuracy compared with the cubic interpolation method and the prism interpolation method. This is due to the fact that as a result of dividing the input color space into a plurality of tetrahedra, a plurality of borders are generated on the divided surfaces of the tetrahedra, thereby causing discontinuity of an interpolation line when it crosses the border surfaces.

In the prism interpolation method, a unit cube is divided along its diagonal lines so as to prepare two triangle poles (prisms), and after it is judged that input value with respect to the inner point of the cube belongs to which one of the prisms thus prepared, interpolation values are determined by taking a weighted summation of six output values respectively corresponding to the six lattice points of the prism, surrounding the input point.

Note that, in the prism interpolation method, practical conversion accuracy can be obtained by simpler calculation algorithm compared with the cubic interpolation method and the tetrahedron interpolation method.

As described, since the three-dimensional interpolation using a look-up table can be carried out by any of the cubic interpolation method, the tetrahedron interpolation method, and the prism interpolation method, it is preferable to timely adopt a method which is most suitable for the colors of the image by considering the accuracy and the processing speed etc. of the method.

The following will explain the flowchart of FIG. 1.

If the RGB signals exist in the specific unit cube 11 in S3, it is judged in the specific unit cube 11 that the RGB signals belong to which unit cube of the second lattice 20, which is provided by dividing the specific unit cube 11 (S7). Thereafter, a look-up table storing coordinates of lattice apices of each unit cube (provided with the RGB signals) of the second lattice 20 is selected (S8), and the RGB signals are subjected to color correction by the three-dimensional interpolation according to the values of the look-up table (S9). Here, as the three-dimensional interpolation, the cubic interpolation method is adopted which has higher accuracy than that of the prism interpolation method. However, in this case, the processing speed is slower compared with the case of adopting the prism interpolation method. The image data thus subjected to color correction are outputted through the output device 3 (S6).

As described, in the present embodiment, for the specific unit cube 11, an interpolation method having higher accuracy than that of unit cubes other than the specific unit cube 11 is adopted. This reduces the distance between coordinates with respect to the RGB signals of the specific unit cube 11, thereby reducing the occurrence of a conversion error.

Note that, in the present embodiment, the cubic interpolation method is adopted for the unit cubes of the second lattice 20 in the specific unit cube 11. However, the method is not limited to the specified one. For example, provided that sufficient accuracy can be obtained when carrying out interpolation with respect to the RGB signals belonging to the unit cubes of the second lattice 20, it is possible to adopt the tetrahedron interpolation method. In this case, a faster processing speed can be obtained.

As described, in the color image processing apparatus of the present embodiment, inputted color data based on the color separation signals of R, G, and B belong to any one of the unit cubes which have been provided by dividing the color separation signal space in the form of a lattice. In the case of accurately outputting, for example, flesh tones, the unit cube provided with flesh tones is set as the specific unit cube 11.

This induces the specific unit cube 11 to be further divided in the form of a lattice, and its coordinates of the lattice points are additionally stored in the look-up table as the second lattice 20.

Thus, in the case where the inputted color data belong to the specific unit cube 11, it is judged that the inputted color data belong to which unit cube of the second lattice 20, which is more finely divided than the first lattice 10. The inputted color data are then subjected to color correction according to the table data represented by the coordinates (apices) of the fine unit cube of the second lattice 20.

In the present embodiment, depending on whether or not the inputted color data belong to the specific unit cube 11 in the lattice, color correction with different conversion accuracy is carried out.

Thus, for example, in the case where the inputted color data do not belong to the specific unit cube 11, it is possible to adopt a color correction method such as the prism interpolation method using the table data of the first lattice 10. In the prism interpolation method, practical conversion accuracy can be obtained with simple algorithm.

Also, in the case where the inputted color data belong to the specific unit cube 11, it is possible to adopt a color correction method such as the cubic interpolation method using the table data of the second lattice 20. In this case, compared with the case of adopting the prism interpolation method, higher accuracy can be obtained, but the processing speed is slower.

As described, a different type of color correction method can be adopted depending on whether or not the inputted color data belong to the specific unit cube 11 in the lattice. This makes it possible to carry out accurate color correction with respect to a specified color such as flesh tones. Also, this makes it possible to carry out rapid color correction and an output process with respect to other colors. Further, provided that sufficient accuracy can be obtained irrespective of an adopted interpolation method, it is possible to adopt an interpolation method having a faster processing speed for the color correction of a specified color.

Also, a specified color such as flesh tones is color-corrected by using the table data represented by the fine lattices of the second lattice 20, thereby reducing the occurrence of the interpolation error.

Further, since the inputted color data are color-corrected according to the coordinates of the lattice points of the unit cube to which the inputted color data belong, each lattice constitutes data of the border, thereby permitting to carry out color correction taking into account of the continuity of adjacent regions.

Thus, it is possible to provide a color image processing apparatus which (1) reduces the occurrence of an error when color-correcting colors requiring highly accurate color correction and (2) prevents the continuity of an image from not being kept.

Second Embodiment

The following will describe a second embodiment of the present invention. Note that, for the convenience, the members having the same functions as those shown in Figures described in the first embodiment are given the same reference numerals, and the explanations thereof are omitted here.

The color correcting device 2 of the color image processing apparatus of the first embodiment has the following arrangement: As shown in FIG. 3(a), each R, G, and B axis of the color separation signal space is divided into 5 units in the form of a lattice. The color separation signal space thus divided in this manner constitutes the first lattice 10. As shown in FIG. 3(b), in order to faithfully reproduce, for example, flesh tones, each axis of the specific unit cube 11 of the first lattice 10 is further divided into 4 units in the form of a lattice. The specific unit cube thus divided in this manner constitutes the second lattice 20. The coordinates (apices) of the respective unit cubes of the first lattice 10 and the second lattice 20 are stored in the look-up table.

Figures 4A, 4B:
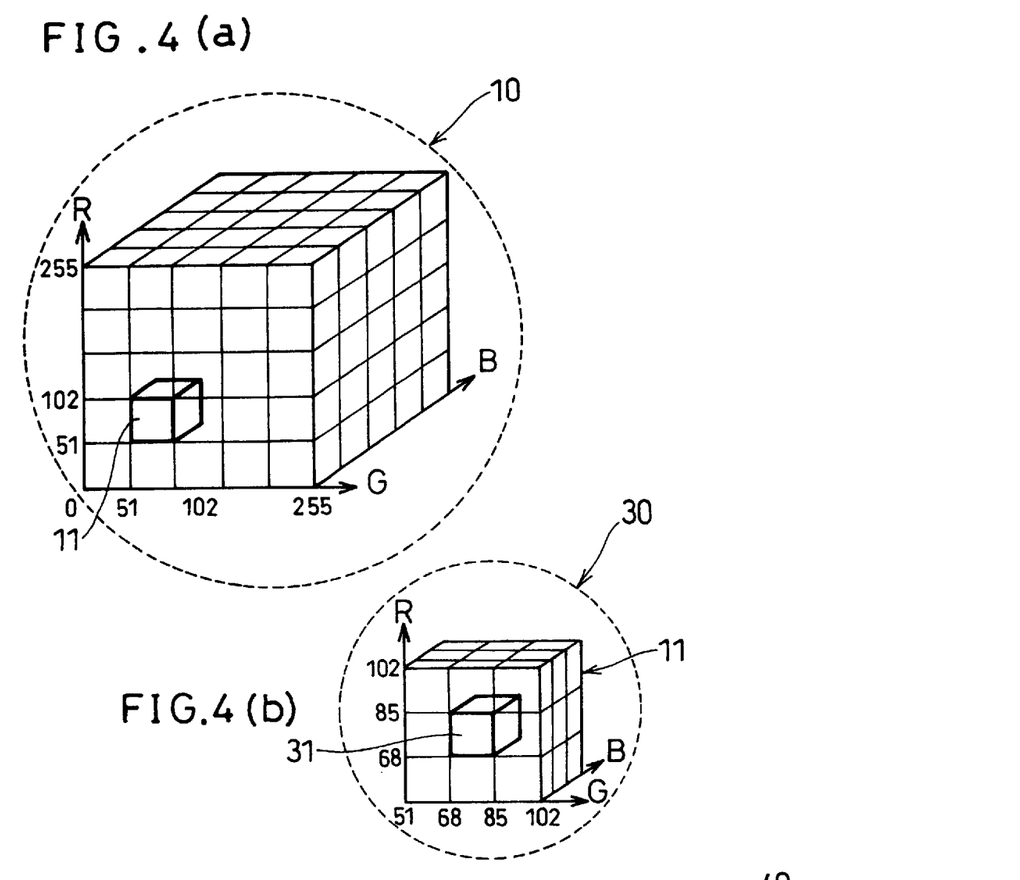
FIG. 4(a) is an explanatory drawing showing the first lattice which is obtained by dividing the RGB color separation signal space in the form of a lattice.
FIG. 4(b) is an explanatory drawing showing the second lattice which is obtained by further dividing the specific unit cube of the first lattice.
Figure 4C:
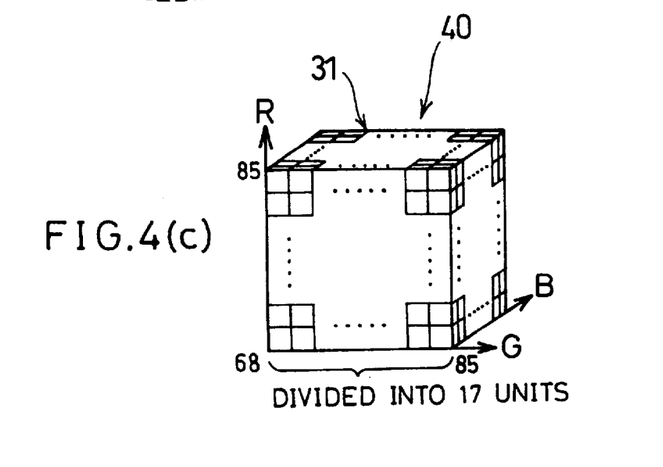
FIG. 4(c) is an explanatory drawing showing a third lattice which is obtained by further dividing a specific unit cube of the second lattice.

In the present embodiment, as shown in FIG. 4(a) through FIG. 4(c), there are provided a first lattice 10, a second lattice 30, and a third lattice 40. (a) The first lattice 10, (b) a specific unit cube 11 of the first lattice 10, and (c) a specific unit cube 31 of the second lattice 30 are respectively divided into 5 units, 3 units, and 17 units in the form of a lattice. The specific unit cube 11 and the specific unit cube 31 thus divided in this manner respectively constitute the second lattice 30 and the third lattice 40. The coordinates (apices) of the respective unit cubes of the first lattice 10, the second lattice 30, and the third lattice 40 are stored in a look-up table.

Also, since inputted image data which have been read by a color scanner are color-separated into digital signals of R, G, and B respectively having 256 tones in accordance with the optically scanned original image, and since the third lattice is prepared by dividing the color separation signal space into 255 units (255÷5÷3÷17=1), the coordinates of each lattice apex of the third lattice 40 represent one of the color data of the inputted image. Thus, by using data, as output data, representing the coordinates of the lattice apices of the third lattice 40 stored in the look-up table, it is possible to directly output the output data without interpolating the corresponding input data.

This permits to directly use the data stored in the look-up table, thereby ensuring to accurately reproduce a specified color such as flesh tones.

Note that, in the color correcting device 2 of the present embodiment, (1) the first lattice 10 is prepared by dividing each R, G, and B axis of the color separation signal space into 5 units in the form of a lattice, (2) the second lattice 30 is prepared by dividing each R, G, and B axis of the specific unit cube 11 of the first lattice 10 into 3 units, and (3) the third lattice 40 is prepared by dividing each R, G, and B axis of the specific unit cube 31 of the second lattice 30 into 17 units. However, the number of units by which each lattice is divided is not limited to the specified ones. Thus, even in the case where the look-up table of the third lattice 40 is not coincident with the input data, since a specified color is divided by three stages, it is possible to more accurately reproduce the specified color such as flesh tones since the occurrence of the interpolation error is reduced.

Further, in the present embodiment, the color separation signal space is divided by three stages wherein the first lattice 10, the second lattice 30, and the third lattice 40 are respectively divided into 5 units, 3 units, and 17 units with respect to the RGB signals. However, the number of units by which the each lattice is divided and the number of stages by which the color separation signal space is divided are not limited to the specified ones. For example, it is possible to adopt different number of dividing units so as to further divide a specific unit cube of the third lattice 40 while additionally storing resulting data in the look-up table.

Also, in the present embodiment, the RGB signals of the respective first lattice 10, the second lattice 30, and the third lattice 40 are divided by the same number of units. However, it is not required to divide each RGB signal by the same number of units. For example, the RGB signals of the first lattice 10 can be divided into 5 units, 4 units, and 3 units, respectively.

Figure 5:
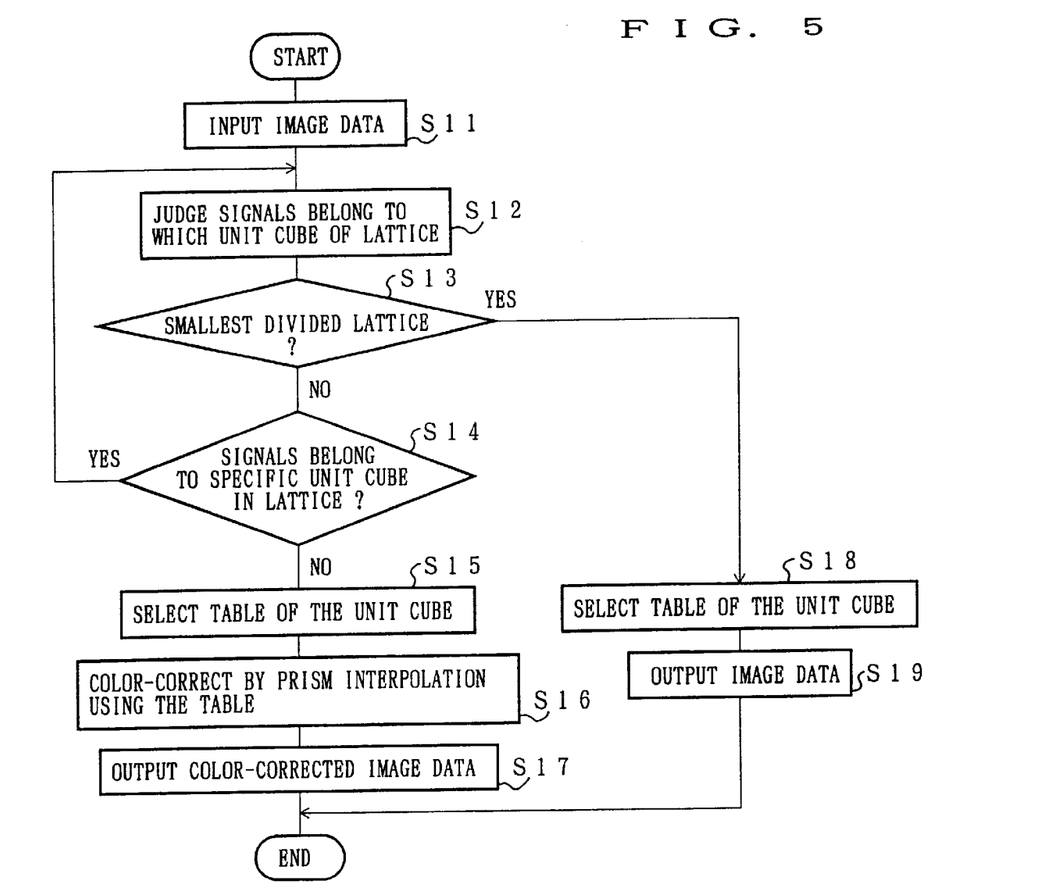
FIG. 5 is a flowchart showing color correction operation wherein the RGB color separation signal space is recursively divided up to the third lattice.

The following will explain, referring to the flowchart of FIG. 5, color correcting operation of the color correcting device 2 of the color image processing apparatus.

First, image data are inputted through the input device 1 (S11). Thereafter, it is judged that the RGB signals belong to which unit cube in the color space of the first lattice 10 so as to color-correct the image data in the color correcting device 2 (S12).

Then, it is judged whether the first lattice 10 is the smallest divided lattice (S13). Here, since the first lattice 10 is not the smallest divided lattice (No), it is judged in S14 whether the RGB signals of the inputted data belong to the specific unit cube 11.

If the RGB signals of the inputted data exist in a unit cube other than the specific unit cube 11 in S14, a look-up table storing the coordinates of the lattice apices of the unit cube provided with the RGB signals is selected (S15) so as to carry out color correction by the prism interpolation (S16). The image data thus color-corrected are outputted through the output device 3 (S17).

On the other hand, if the RGB signals of the inputted data exist in the specific unit cube 11 in S14, the sequence returns to S12 so as to judge that the RGB signals belong to which unit cube of the color space of the second lattice 30. Thereafter, it is judged in S13 whether the second lattice 30 is the smallest divided lattice. Here, since the third lattice 40 exists (No), the sequence goes to S14 so as to judge whether the RGB signals of the inputted data belong to the specific unit cube 31.

If the RGB signals of the inputted data exist in a unit cube other than the specific unit cube 31, the sequence goes to S15 through S17 so as to select a look-up table storing coordinates of the lattice apices of the unit cube provided with the RGB signals (S15), carry out color correction by the prism interpolation (S16), and output the image data thus color-corrected through the output device 3 (S17).

On the other hand, if the RGB signals of the inputted data exist in the specific unit cube 31 in S14, the sequence returns to S12 so as to judge that the RGB signals belong to which unit cube of the third lattice 40. Thereafter, it is judged in S13 whether the third lattice 40 is the smallest divided lattice. Here, since the third lattice 40 is the smallest divided lattice (Yes), the look-up table of the unit cube provided with the RGB signals in the third lattice 40 is selected (S18).

Here, since the data stored in the look-up table of the third lattice 40 can be used as output data as they are, the data stored in the look-up table of the third lattice 40 are directly outputted as image data (S19).

As described, in the case where the inputted data are coincident with the lattice coordinates of the third lattice 40, the data stored in the look-up table are directly outputted as image data without carrying out the three-dimensional interpolation, thereby permitting (1) to carry out optimum outputting without being affected by the conversion error due to the interpolation and (2) to reduce the time required for outputting because it is not required to carry out calculation for interpolation.

As described, in the color image processing apparatus of the present embodiment, the specific unit cube 31 of the second lattice 30 divided in the form of a lattice is further divided so as to additionally store the coordinates of the lattice points of the third lattice 40 in the look-up table. This reduces the distance between lattices such that the occurrence of interpolation error is further reduced, thereby permitting to carry out color correction more accurately with respect to a specified color such as flesh tones.

Further, in the color image processing apparatus of the present invention, the specific unit cubes 11 and 31 respectively divided in the form of a lattice are further divided recursively. This makes it possible, as in the look-up table of the third lattice 40, for the following (a) and (b) to be coincident with each other. (a) The digital inputted color data which have been read by the input device 1 in 256 tones with respect to each of the RGB signals. (b) Table data representing the coordinates of each lattice point.

Note that, in the present embodiment, the table data of lattice points coincident with the inputted color data are directly outputted.

Thus, because the table data corresponding to the inputted color data are directly outputted as output data, it is possible to output an optimum image. Also, the conversion error due to the interpolation can be completely eliminated.

Note that, according to the described arrangement, the look-up table of the third lattice 40 is coincident with the inputted color data. However, by appropriately setting the respective number of units by which the first lattice 10 and the second lattice 40 or a smaller lattice are divided, it is also possible to directly output the table data stored in the look-up table that is coincident with the inputted color data.

Also, in the present embodiment, when dividing the specific unit cubes 11 and 31 recursively, it is possible to change the number of units by which the specific unit cubes 11 and 31 are divided. Therefore, in the case of outputting a specified color with desired accuracy, the number of units to be divided can be changed accordingly.

Third Embodiment

The following will describe a third embodiment of the present invention. Note that, for the convenience, the members having the same functions as those shown in Figures described in the first and second embodiment are given the same reference numerals, and the explanations thereof are omitted here.

Figures 6A, 6B, 6C:
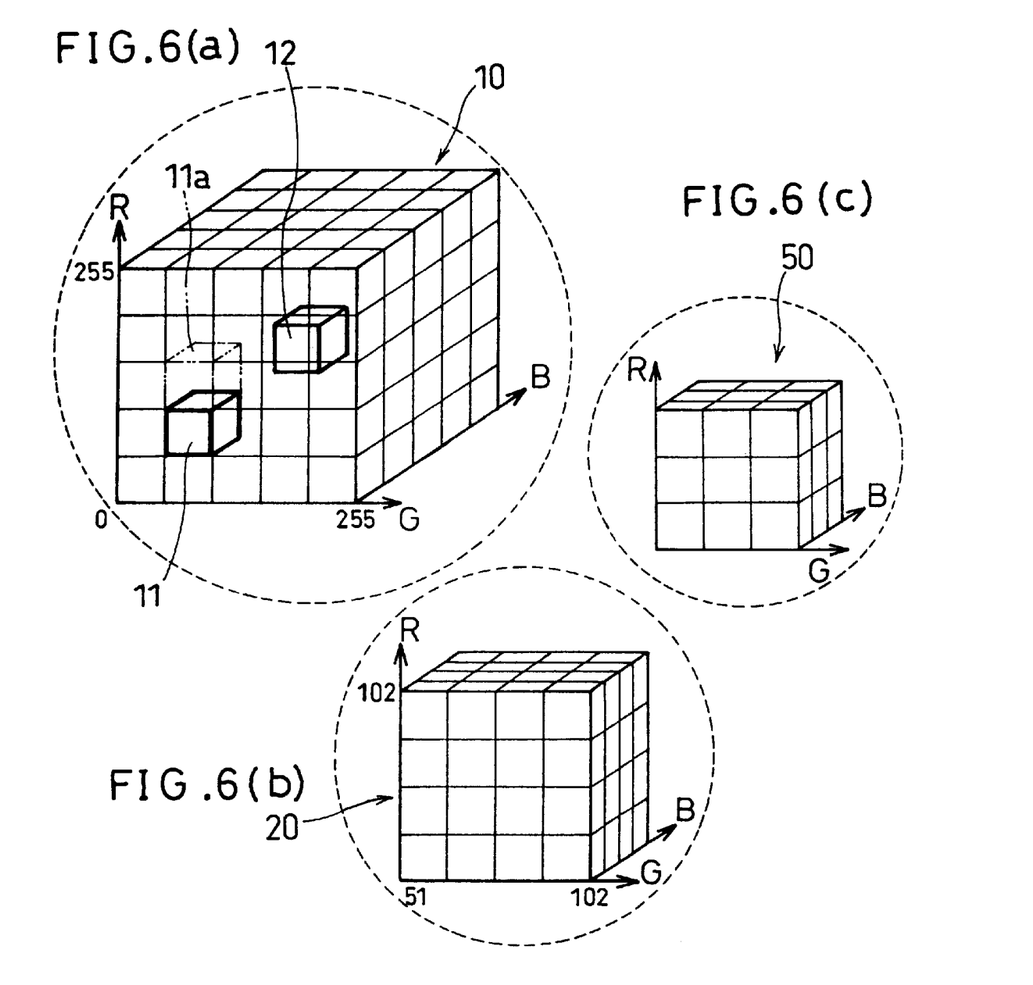
FIG. 6(a) is an explanatory drawing showing the first lattice which is obtained by dividing the RGB color separation signal space in the form of a lattice.
FIG. 6(b) is an explanatory drawing of a second lattice which is obtained by further dividing a specific unit cube of the first lattice.
FIG. 6(c) is an explanatory drawing of a second lattice which is obtained by further dividing another specific unit cube of the first lattice.

The specific unit cube 11 of the first lattice 10 of the color image processing apparatus of the first and second embodiment is provided for accurately correcting a specified color such as flesh tones. However, in the color image processing apparatus of the present embodiment, as shown in FIG. 6(a) through FIG. 6(c), other than the specific unit cube 11 set for flesh tones, in order to accurately correct sky blue, another specific unit cube 12 is provided in the first lattice 10. The specific unit cube 12, like the specific unit cube 11, is further divided so as to constitute a second lattice 50, and coordinates of lattice apices of unit cubes of the second lattice 50 are also stored in the look-up table.

Namely, in the present embodiment, a plurality of specific unit cubes 11 and 12 are provided in a single first lattice 10. With this arrangement, it is possible to accurately output not only flesh tones but also a plurality of specified colors including, for example, sky blue.

Note that, in this case, not necessarily the same interpolation method is used for the second lattice 20 of the specific unit cube 11 and the second lattice 50 of the specific unit cube 12. This is because even when the specific unit cubes 11 and 12 have the same distance between respective lattice points, interpolation accuracy differs for flesh tones and sky blue.

Figure 7:
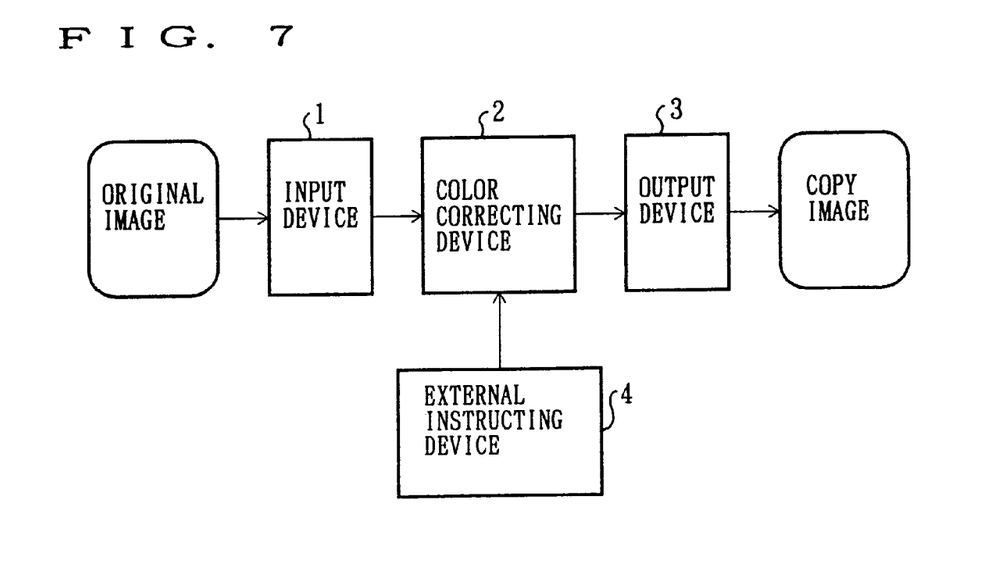
FIG. 7 is a block diagram showing a schematic structure of the color image processing apparatus.

Also, in the present embodiment, as shown in FIG. 7, the color correcting device 2 is linked with an external instructing device 4 (instructing means) This allows to selectively instruct by an external input operation whether to carry out color correction using the specific unit cubes 11 and 12.

For example, when it is selected by the external instructing device 4 to accurately color-correct sky blue, the coordinates of the lattice points of the second lattice 50, which has been prepared by dividing the specific unit cube 12, are additionally stored in the look-up table. On the other hand, when it is not selected to accurately color-correct sky blue, the coordinates of the lattice points of the second lattice 50 are not additionally stored in the look-up table, rather color correction is carried out by interpolation using the look-up table of the first lattice 10.

Thus, when it is not selected to accurately color-correct sky blue, it is possible to more rapidly process the image compared with the case of selecting to accurately color-correct sky blue.

Note that, in the present embodiment, the specific unit cubes 11 and 12 respectively constitute a single unit cube. However, the arrangement is not limited to the specified one. For example, in the case where it is not possible to represent flesh tones by a single specific unit cube 11, it is possible to provide a plurality of specific unit cubes 11 and 11a which are divided so as to constitute second lattices, respectively.

This allows to reduce the occurrence of the conversion error with respect to a wide range of RGB signals.

Also, in the present embodiment, as shown in FIG. 6(b) and FIG. 6(c), the specific unit cubes 11 and 12 respectively constitute the second lattice 20 having 125 lattice points (5×5×5=125) and the second lattice 50 having 64 lattice points (4×4×4=64). The second lattices 20 and 50 are obtained by dividing the RGB signals into 4 units and 3 units, respectively.

Also, it is possible to set the number of divided units. Namely, the respective specific unit cubes are divided by the setted number. This is due to the fact that even when the specific unit cubes 11 and 12 have the same distance between respective lattice points, namely, even when the specific unit cubes 11 and 12 are divided into the same number of units, respectively, the interpolation accuracy differs depending on a position in the color space. In other words, for example, the specific unit cube 12 for correcting sky blue has higher interpolation accuracy than that of the specific unit cube 11 for correcting flesh tones. Therefore, even when the specific unit cube 12 is divided into a smaller number of units than the number of units by which the specific unit cube 11 is divided, it is possible to color-correct sky blue with sufficient correcting accuracy. Note that, even when the interpolation calculations are carried out for both the specific unit cubes 11 and 12 in accordance with the same method, the interpolation accuracy differs depending on a position in the color space.

As a result, 117 (5×5×5−8=117) lattice points and 56 (4×4×4−8=56) lattice points are added to the data stored in the look-up table. Thus, by changing the number of units by which the specific unit cubes 11 and 12 are divided according to the accuracy required for respective the RGB signals of the specific unit cubes 11 and 12, it is not required to store an unnecessary look-up table in a memory.

Also, in the present embodiment, the cubic interpolation is adopted for the RGB signals of the second lattice 20, and the prism interpolation is adopted for the RGB signals of the second lattice 50. For this reason, the conversion error is reduced in the specific unit cube 11 so as to ensure accuracy, whereas in the specific unit cube 12, processing speed is given a priority.

Note that, in the case where it is ensured that the RGB signals of the specific unit cube 11 can be corrected with sufficient accuracy by any of the described interpolation methods, it is possible to further increase the processing speed by adopting the tetrahedron interpolation method.

As described, according to the color image processing apparatus of the present embodiment, it is possible to provide a plurality of specific unit cubes in a lattice. Thus, in the case where the color separation signal space is divided in the form of a lattice so as to set the specific unit cube 11 as flesh tones in order to accurately output, for example, flesh tones, and when it is desired to accurately output another color such as sky blue in the same manner, the specific unit cube 12 is set as sky blue in addition to the specific unit cube 11 which has been set as flesh tones, thereby permitting to accurately output both colors.

In the case where a specific unit cube 11 alone is not sufficient for accurately outputting flesh tones, a unit cube in a vicinity of the specific unit cube 11 may be used as a specific unit cube 11a for representing flesh tones.

Thus, by using the specific unit cubes 11 and 11a, it is possible to accurately output a wide range of flesh tones.

According to the color image processing apparatus of the present embodiment, the second lattices 20 and 50 are not necessarily divided into the same number of units. Namely, in the case of dividing the specific unit cubes 11 and 12 respectively representing flesh tones and sky blue, it is possible to change the number of units by which flesh tones and sky blue are divided, respectively, in accordance with the respective required output accuracy.

According to this arrangement, when storing respective coordinates of the lattice points of the second lattices 20 and 50, it is possible to reduce the storage capacity of respective look-up tables of the second lattices 20 and 50 while considering to maintain the accuracy.

Also, according to the color image processing apparatus of the present embodiment, inputted image data are divided in the form of a lattice so as to prepare a plurality of specific unit cubes 11 and 12, thereby permitting to accurately output a desired specified color as desired. However, there are cases where the operator does not desire to accurately output a specified color.

Also, in the color image processing apparatus of the second embodiment, considering the accuracy and the processing speed, there are cases where the operator does not desire to further divide, at the respective stages, the specific unit cubes 11 and 31 of the respective first lattice 10 and the second lattice 30 (see FIG. 4(a) through FIG. 4(c)).

In this case, in the present embodiment, there is provided the external instructing device 4 for externally giving an instruction. Thus, considering the accuracy and the processing speed, an operator is able to select and instruct whether to further divide the specific unit cubes 11 and 31 of the respective first lattice 10 and the second lattice 30 so as to additionally store the lattice coordinates as table data.

This permits to provide an easy-to-operate color image processing apparatus.

Fourth Embodiment

The following will describe a fourth embodiment of the present invention. Note that, for the convenience, the members having the same functions as those shown in Figures described in the first through third embodiment are given the same reference numerals, and the explanations thereof are omitted here.

Figure 8:
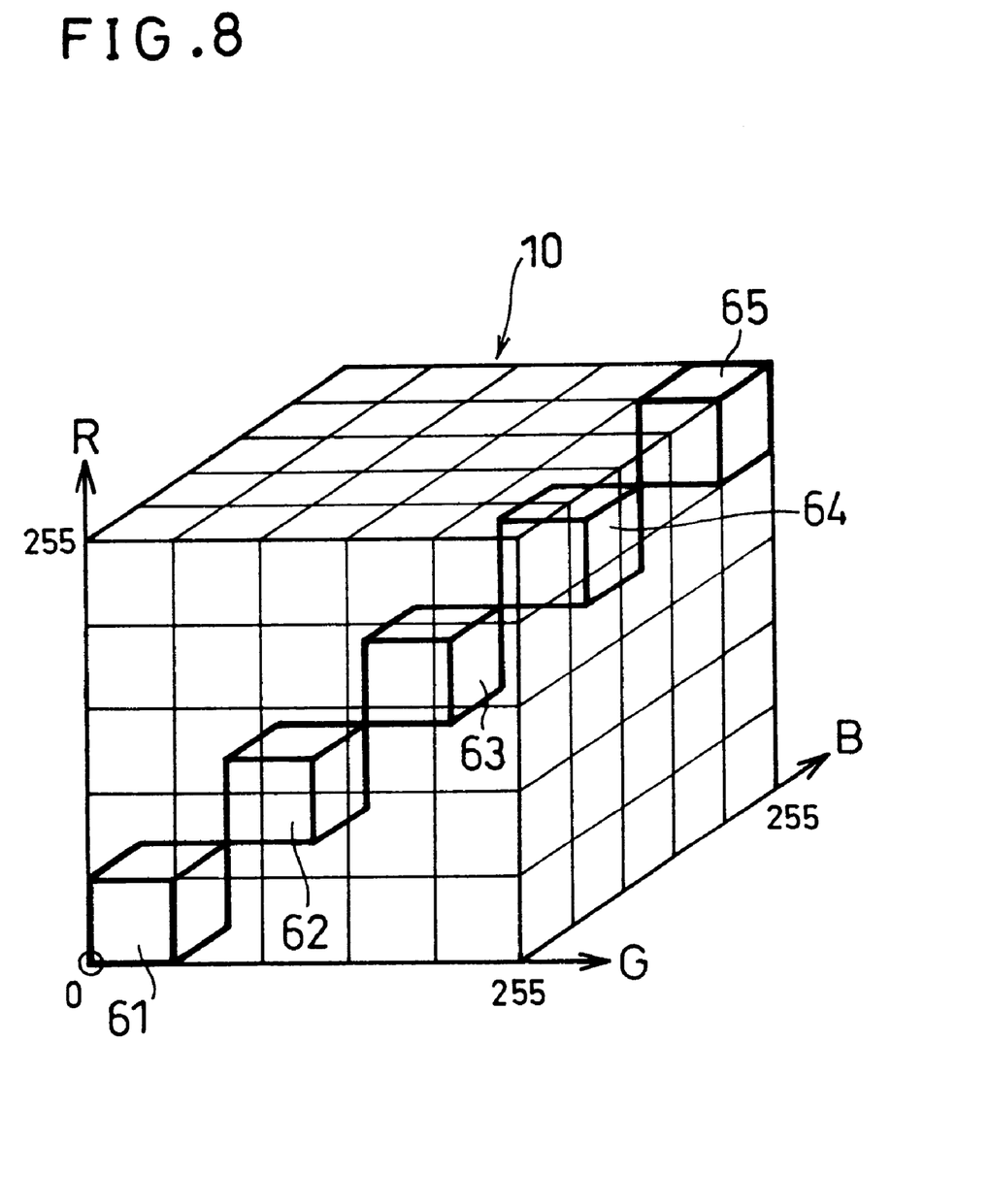
FIG. 8 is an explanatory drawing showing the first lattice provided with a plurality of specific unit cubes for an achromatic color in accordance with a color image processing apparatus of yet another embodiment of the present invention.

In the color image processing apparatus of the present embodiment, as shown in FIG. 8, in order to accurately color-correct an achromatic color such as white, black, and grey, a plurality of specific unit cubes 61 through 65 are provided. Each of the specific unit cubes 61 through 65 are further divided into a plurality of lattices (not shown), and the lattice points of the lattices thus provided are added to the look-up table. Note that, the specific unit cubes 61 through 65 are provided so as to include a segment connecting the color signals of black (R=G=B=0) and white (R=G=B=255).

As described, in the color image processing apparatus of the present embodiment, the plurality of the specific unit cubes 61 through 65 include an achromatic color. Thus, the color image processing apparatus of the present embodiment is suitable for accurately outputting an achromatic color composed of white, black, and grey. With this arrangement, it is possible to reduce the conversion error in the achromatic color so that the achromatic color is accurately reproduced.

This permits to accurately color-correct a black and white multivalued image.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color image processing apparatus comprising input means for reading image information of an inputted color original image, color correcting means for carrying out color correction in accordance with inputted color data based on each color separation signal of the inputted image information, and output means for outputting corrected image data which have been color-corrected, said apparatus further comprising:

first lattice means for dividing a color separation signal space in a form of a lattice so as to store in a table coordinates of lattice points of the color separation signal space thus divided; and second lattice means for further dividing a specific unit cube of the lattice in a form of a lattice so as to additionally store in a table coordinates of lattice points of the specific unit cube thus divided, wherein color correction with different conversion accuracy is carried out depending on whether the inputted color data of the image information belong to the specific unit cube of the lattice.

2. The color image processing apparatus as set forth in claim 1, wherein inputted color data not belonging to the specific unit cube of the lattice are color-corrected by a three-dimensional interpolation method using the coordinates of the lattice points of said first lattice means, whereas inputted color data belonging to the specific unit cube of the lattice are color-corrected by the three-dimensional interpolation method using the coordinates of the lattice points of said second lattice means.

3. The color image processing apparatus as set forth in claim 2, wherein inputted color data not belonging to the specific unit cube of the lattice are color-corrected by the three-dimensional interpolation using a prism interpolation method, whereas inputted color data belonging to the specific unit cube of the lattice are color-corrected by the three-dimensional interpolation using a cubic interpolation method.

4. The color image processing apparatus as set forth in claim 1, wherein the specific unit cube divided in the form of a lattice is further divided so as to additionally store in the table coordinates of lattice points of the divided specific unit cube.

5. The color image processing apparatus as set forth in claim 4, wherein in the case where the inputted color data of the image information are coincident with table data represented by the coordinates of each lattice points, the table data are directly used as an output.

6. The color image processing apparatus as set forth in claim 1, wherein the specific unit cube of the lattice can be provided in plurality.

7. The color image processing apparatus as set forth in claim 6, wherein the number of units by which the specific unit cubes are divided are not necessarily coincident with each other.

8. The color image processing apparatus as set forth in claim 7, wherein the number of units by which the specific unit cubes are divided increase as higher accuracy is required for color correction.

9. The color image processing apparatus as set forth in claim 6, wherein a color correction method having different conversion accuracy is adopted for the each specific unit cube.

10. The color image processing apparatus as set forth in claim 9, wherein a color correction method having higher conversion accuracy is adopted as higher accuracy is required for color correction.

11. The color image processing apparatus as set forth in claim 6, wherein the plurality of specific unit cubes include achromatic colors.

12. The color image processing apparatus as set forth in claim 1, further comprising instructing means for externally instructing whether to further divide the specific unit cube of the lattice in each stage so as to additionally store lattice coordinates as table data.

* * * * *